Figure 1:
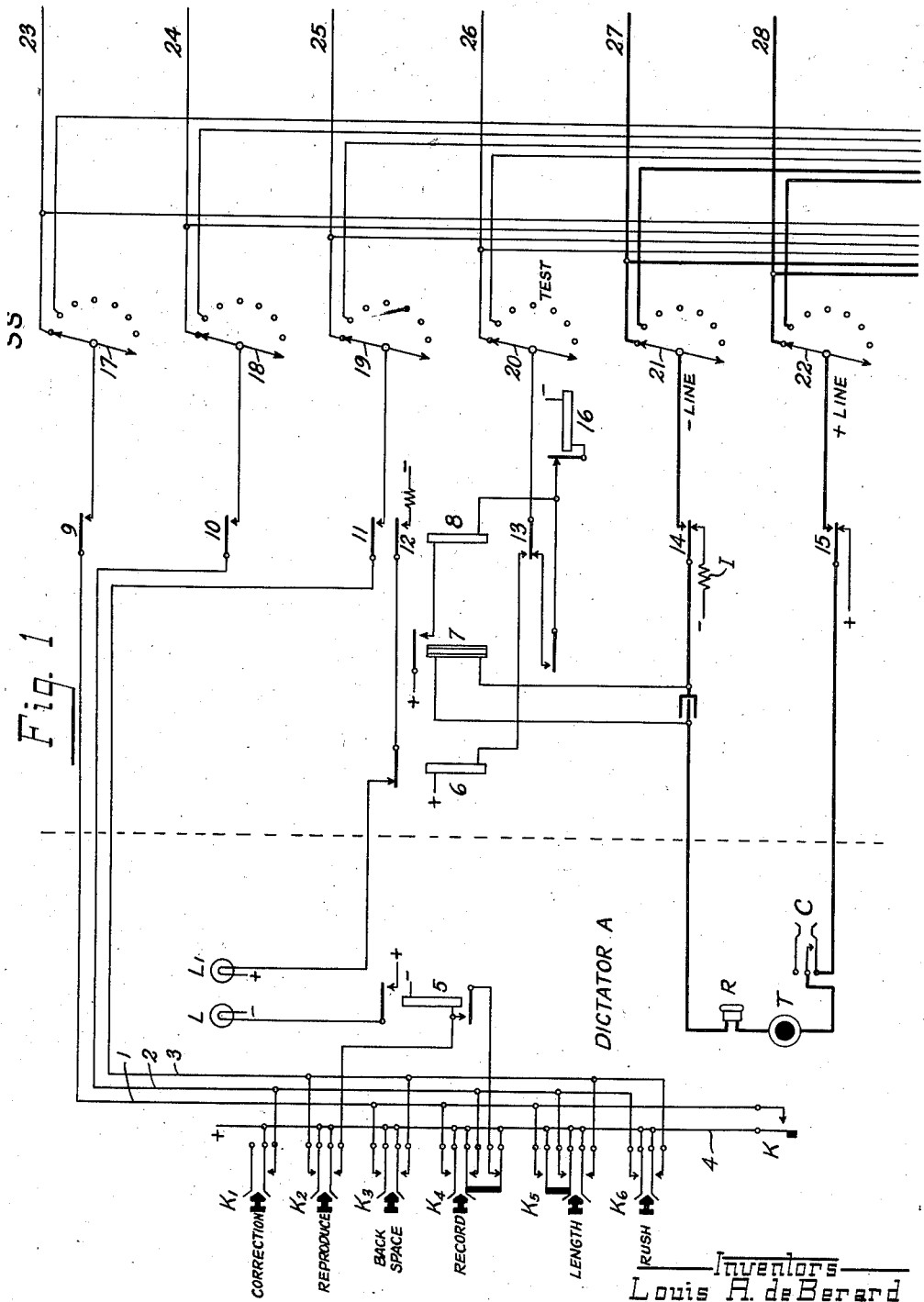

Patented Jan. 5, 1937

2,066,672

UNITED STATES PATENT OFFICE 2,066,672

SYSTEM OF RECORDING

Louis A. de Berard, Glencoe, and George T. Martin, Chicago, Ill., assignors, by mesne assignments, to Associated Electric Laboratories, Inc., Chicago, Ill., a corporation of Delaware Application July 14, 1930, Serial No. 467,854

23 Claims. (Cl. 179—100.4)

This invention relates to systems of recording, in general, but, in particular, to systems of recording voice waves phonographically, in which the recording apparatus is remotely disposed with respect to the place of origination of the voice waves and in which the recording apparatus is capable of being controlled electrically to perform all of the functions necessary in the proper use of the apparatus to obtain the correct transcription of the matter recorded by the apparatus.

Business organizations which carry-on considerable correspondence or which have much type-written matter to be sent out, or at least prepared, employ dictating machines in an endeavor to increase the efficiency of the organization or to reduce stenographic expenses, or both. In such organizations, it sometimes happens that the busy executives object to changing the records of such a machine and object to having the machine on or near their desk, although they do not object to using a dictating machine. It is toward the end of obviating these objections that this invention is directed.

The principal object of this invention, briefly stated, is the provision of a system in which the phonographic recorders, or dictating machines, are remotely disposed with respect to the desks or stations of the dictators and in which a dictating machine is controlled electrically by a dictator to perform the same functions as would be performed under the manual control by the dictator were the dictating machine at the place of dictation.

A feature of the invention is that the equipment at the dictator's position has been reduced to a minimum, consisting only of a telephone instrument, signalling equipment, and a key set.

Another feature consists in the grouping of the dictating machines at a central location where they are under the attention of a supervisor who changes the records whenever necessary.

Another feature of the invention is that a number of dictating machines are made common to a larger number of dictators, thereby reducing the equipment requirements and increasing the overall efficiency of each machine, the machines being automatically selected when required for use.

Other objects and features of the invention which are not specifically mentioned herein, will be apparent when the detailed description of the apparatus and the operation thereof is studied in conjunction with the accompanying drawings, comprising Figs. 1 to 5, inclusive, which, by means of the usual circuit diagrams and symbols, diagrammatically depict a system for remotely controlling phonographic recorders, or dictating machines, such as those manufactured by Thomas A. Edison, Incorporated, Orange, New Jersey, and commonly known as "Ediphones".

Although, in the preferred embodiment of this invention, the Ediphone has been employed, it is to be understood that any other accepted type of dictating machine could be employed to equal advantage as will be evident from the following disclosure.

For a proper arrangement of the drawings, Fig. 2 should be placed directly below Fig. 1, and Figs. 3 and 4 should be placed directly to the right of Figs. 1 and 2, respectively. The equipment to the left of the vertical broken line in Fig. 1 is that at one dictator's position, the dictator at which position hereinafter will be termed "Dictator A", while that equipment to the left of the vertical broken line in Fig. 2 is the equipment at a second dictator's position, the dictator at which position hereinafter will be referred to as "Dictator B".

The equipment at each dictator's position consists of a telephone instrument, preferably of the cradle type but which may just as well be of the pedestal type, having the usual receiver R, transmitter T, the contacts C which correspond to the switchhook contacts, a set of keys K1 to K6, inclusive, which are of the non-locking type of key whose functions are clearly indicated on the drawings, a dictating key K, a relay 5, and a pair of signal lamps L and L1. When a telephone of the cradle type is used, the dictating key K is conveniently mounted in the handle of the telephone instrument, while the keys K1 to K6, inclusive, the relay 5, and the two signal lamps are conveniently mounted in the base, or stand, supporting the cradle which receives the telephone instrument when it is not being used. In the well-known manner, the contacts C are held separated when the telephone instrument rests in the cradle and are allowed to engage each other when the hand telephone instrument is removed from the cradle. In the pedestal type of telephone, the contacts are separated when the receiver is on the hook and are engaged when the receiver is off of the hook.

To the left of the vertical line in Fig. 1 is a rotary selecting switch which is individual to dictator A and which has for its functions the selection of an idle dictating machine and the connection of the telephone instrument and key set of the control equipment to the selected dictating machine. This rotary switch SS is of the well-known type of rotary switch whose wipers move in a forward direction only in a step-by-step manner and remain in the position last used. The equipment to the right of the vertical line in Fig. 2 is a second rotary-selecting switch SS' which is individual to the dictator B. This switch is identical with that shown in Fig. 1.

Figure 2:
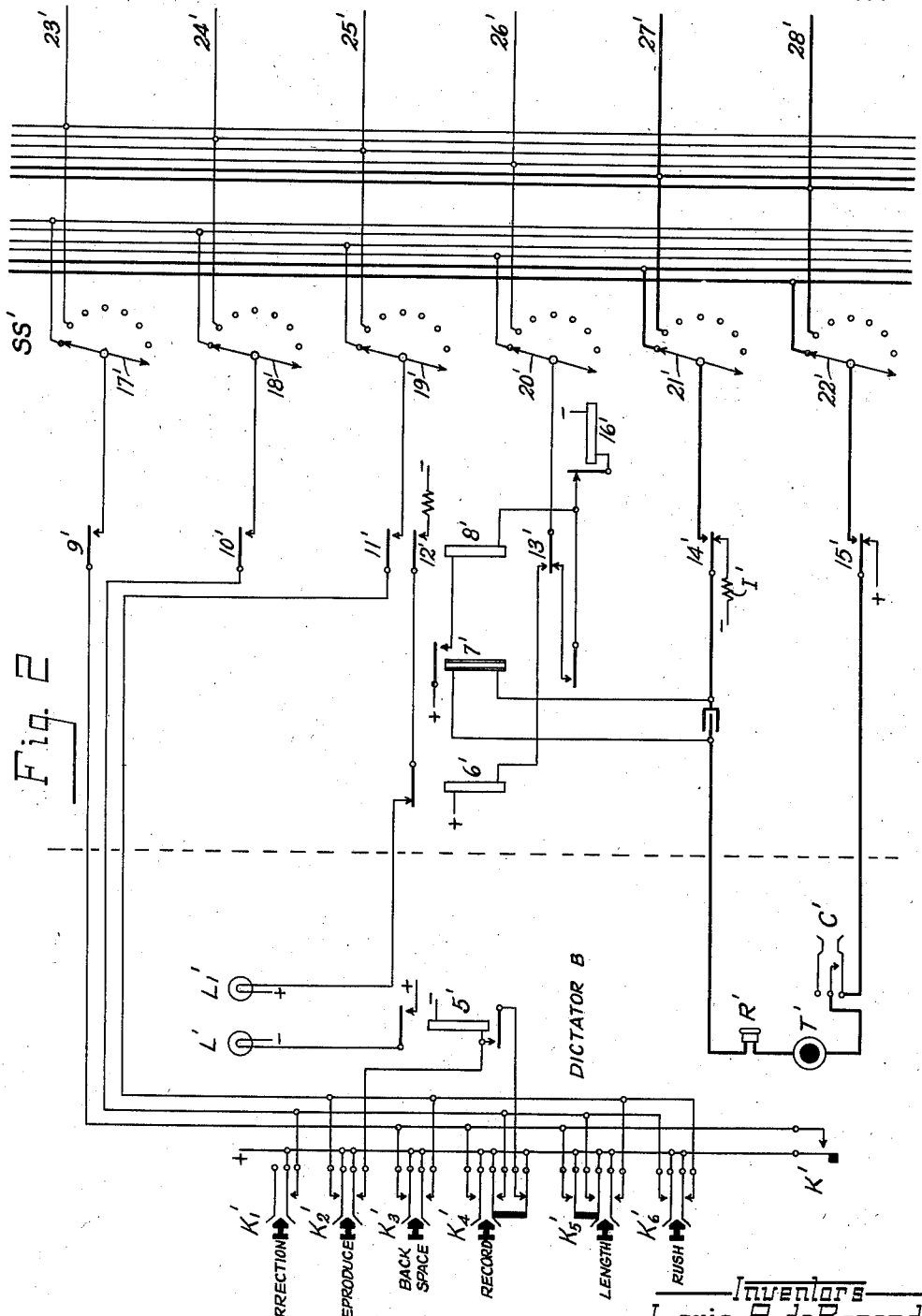

Although only two dictators' positions have been shown in Figs. 1 and 2, it is to be understood that there are a large number of such positions and that each position has a rotary selecting switch SS individual thereto.

Figure 3:
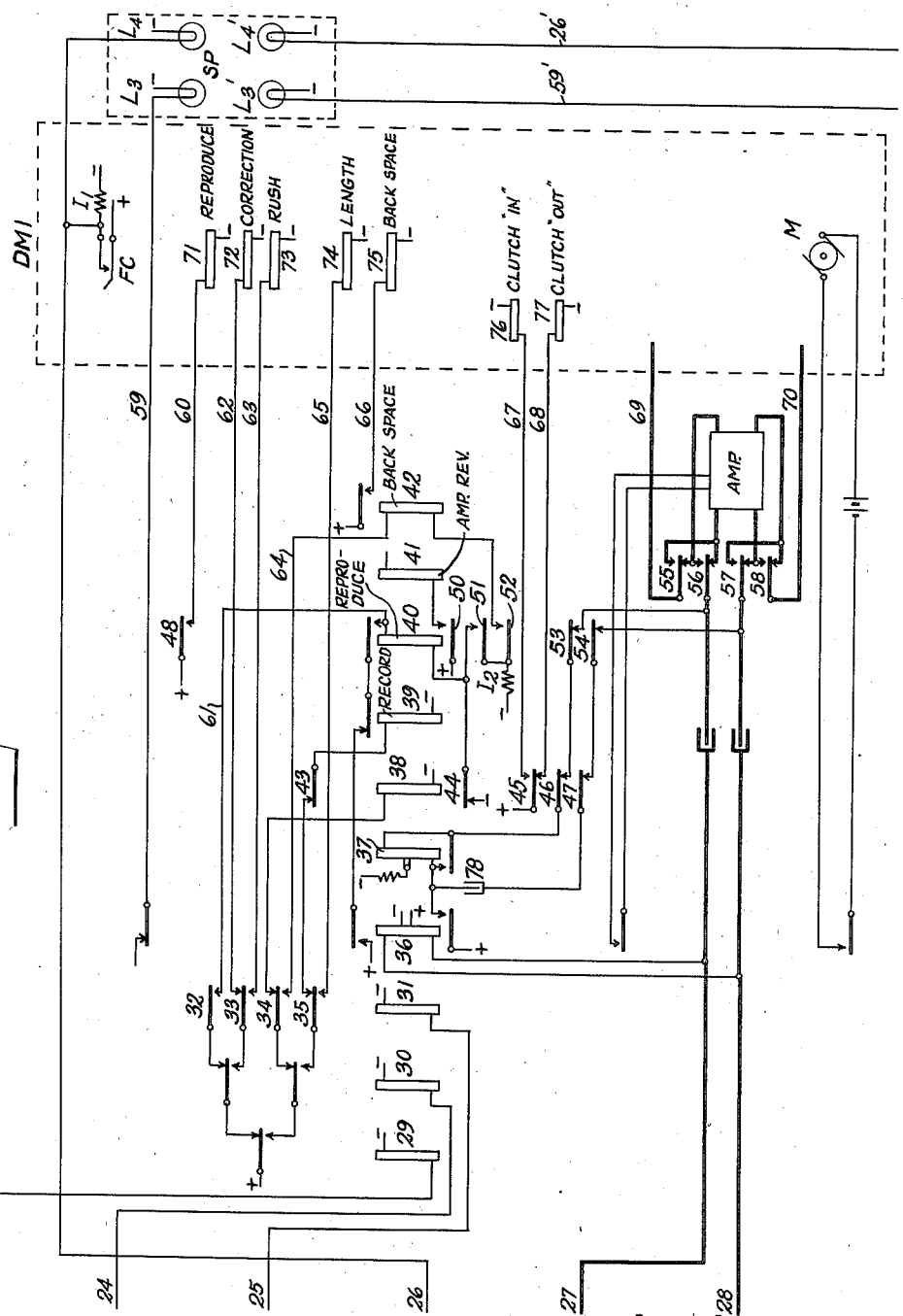

To the right in Fig. 3 is a large rectangle designated DM1. This rectangle represents an Ediphone of which only the clutch magnets and the motor have been shown. Ediphones are well known and it is therefore thought unnecessary to show them in detail. The new equipment added to the Ediphone consists of the electro-magnets 71 to 75, inclusive, and a pair of spring contacts FC whose functions will be described in detail subsequently. Associated with the Ediphone, or dictating machine DM1, is a group of relays, the function of which is to control the various functions of the dictating machine, and an amplifier which may be any well-known oneway voice-current amplifier employing audion tubes, or an amplifier of the mechanical type. This amplifier is represented by the small rectangle in the lower-central portion of the drawings.

To the right of the dictating machine DM1 is a small broken line rectangle designated SP, which is the supervisory panel located at the supervisor's position and which consists of a series of lamps for each dictating machine, there being two lamps in each series. The purpose of these lamps will be explained in detail subsequently.

Figures 4, 5:
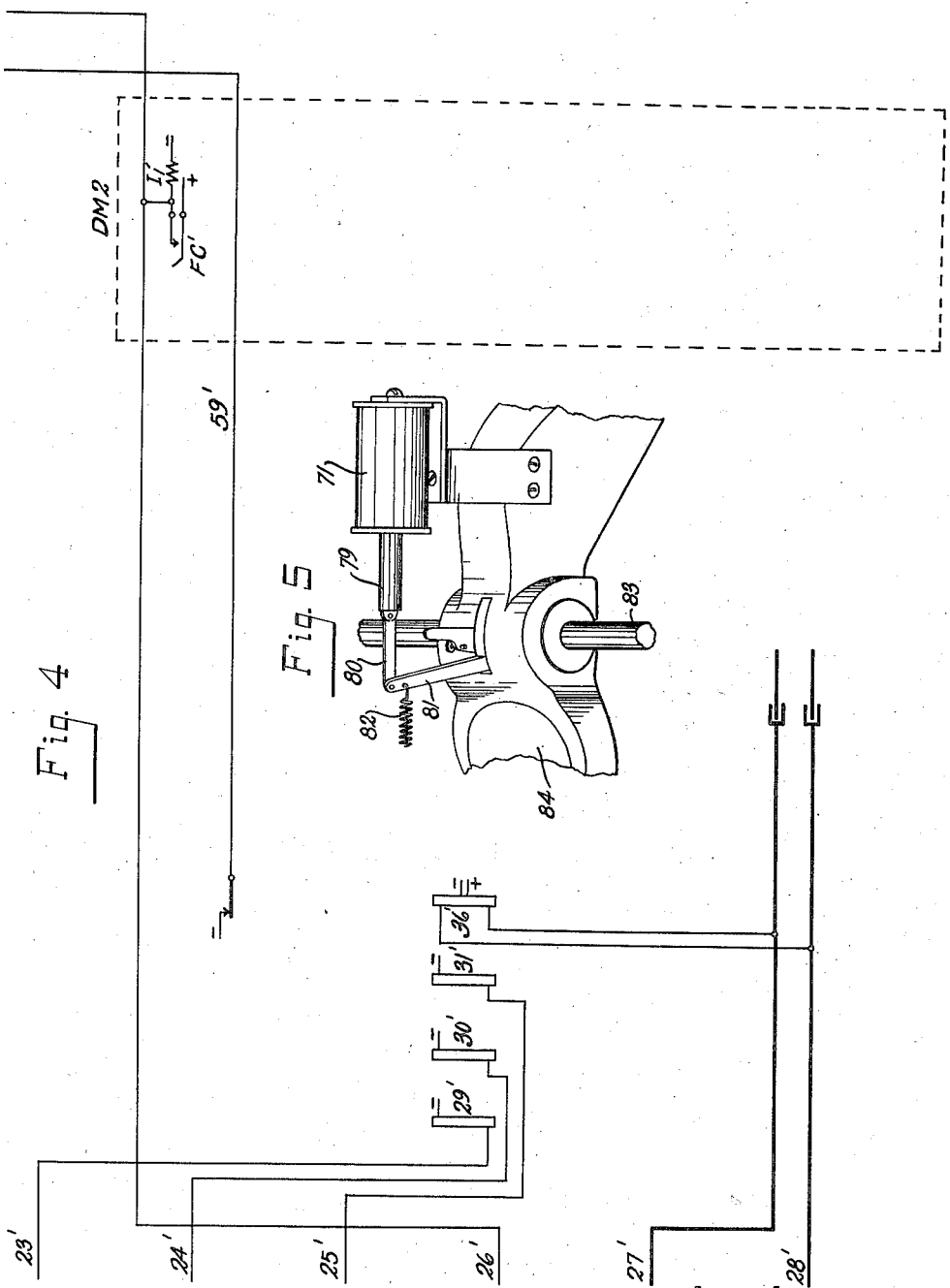

There is represented in Fig. 4 a second dictating machine DM2 of which only the spring contacts FC' have been shown. This dictating machine is identical with that in Fig. 3, as are also the control relay group and the amplifier, and it has not been shown in detail since a description of the equipment in Fig. 3 will suffice for that of Fig. 4. There will be as many dictating machines in a group as there are contacts in a blank of one of the wipers of a selecting switch.

A detail of the mechanical arrangement whereby a dictating machine may be changed from recording condition to reproducing condition is shown in Fig. 5. This arrangement will be described in detail as the description progresses.

As a working basis for a detailed description of the operation of the invention, it will be assumed that dictator A desires to dictate several letters. Such being the case, dictator A picks up the telephone instrument from the cradle, or removes the receiver from the hook, thereby allowing the spring contacts C to engage and complete the following circuit: negative battery, resistor I, resting contact and armature 14 of relay 8, winding of relay 7, receiver R and transmitter T of the telephone instrument in series, engaged contacts C, and armature 15 and its resting contacts to positive battery.

Relay 7 energizes in this circuit and attracts its armatures, thereupon at its upper armature completing the following circuit for switching relay 8: positive battery, upper armature and make contact of relay 7, winding of relay 8, interruptor contacts of motor magnet 16, and winding of motor magnet 16 to negative battery. At its lower armature and make contact, relay 7 connects the test wiper 20 of the selecting switch SS to the junction of the windings of relay 8 and motor magnet 16.

Operation of the relay 8 and of motor magnet 16 at this stage is dependent upon whether or not the wipers of the selecting switch SS are standing upon contacts to which is connected a busy dictating machine, that is, a machine which is being used by another dictator. The condition of the dictating machine with which the wipers of the switch SS are in engagement at this time will be determined by the battery potential encountered by test wiper 20 and the contacts of its bank.

Assuming that the wipers of selecting switch SS are standing in engagement with a busy dictating machine, positive battery potential will be encountered by the test 20, which potential, because the lower armature of relay 7 is in engagement with its make contact, short-circuits relay 8 and causes the energization of motor magnet 16. Upon energizing, motor magnet 16 interrupts its own circuit at its interrupter contacts. The motor magnet 16, thereupon deenergizes and advances the wipers 17—22, inclusive, of the selecting switch SS, into engagement with the next set of bank contacts in the well-known manner. If another busy machine is encountered, the motor magnet 16 will again operate to advance the selecting-switch wipers another step. This cycle of operations will continue until the test wiper 20 encounters a contact in its bank which has negative battery potential connected thereto instead of positive battery potential.

It will be assumed that the dictating machine DM1 is the first idle machine encountered in the selecting operation of switch SS. Therefore, when the test wiper 20 is moved into engagement with the first contact of its bank or that to which conductor 26 is connected, no positive battery potential will be encountered and the switching relay 8 will no longer be short circuited. Relay 8 thereupon energizes in series with motor magnet 16, but, because of the relatively high resistance of relay 8, motor magnet 16 does not operatively energize in series with the relay 8.

Relay 8 upon energizing, attracts its armatures 9 to 15, inclusive, into engagement with their make contacts. At armatures 9, 10, and 11, the control conductors 1, 2, and 3 are connected, respectively, to wipers 17, 18, and 19 of the selecting switch SS. At armature 12, a circuit is prepared for the signal lamp L1. At armatures 14 and 15, the telephone instrument is connected to the line wipers 21 and 22 of the selecting switch SS, whereupon the original energizing circuit of the relay 7 is open. Since line wipers 21 and 22 are in engagement with the contacts to which the line conductors 27 and 28 are connected, the line relay 36, Fig. 3, will energize in a closed circuit over these line conductors in series with the winding of relay 7 and the receiver and transmitter of the telephone instrument, thereby holding the relay 7 energized. At armature 13 of relay 8, the low resistance relay 6 is connected to the test wiper 20 and consequently to test conductor 26 which leads to the dictating machine DM1, Fig. 3. A multiple negative battery connection to the conductor 26 is supplied in the dictating machine DM1 through the resistor 11 and through the busy-signal lamp L4 which is located in the supervisor's panel. Relay 6 thereupon energizes and moves its armature out of engagement with its resting contact, thereby opening the circuit of the signal lamp L1 which was closed by armature 12 of relay 8. The signal lamp L4 in the supervisor's panel lights in series with the low resistance relay 6 to indicate to the supervisor that dictating machine DM1 has been taken into service.

Since the winding of the low resistance relay 6 is connected to positive battery, the connection of this relay through the wiper 20 places a positive battery potential upon the test contact in the bank of wiper 20 and consequently in the first bank contacts of the wipers 20 of all of the selecting switches SS, since, as can be seen by the drawings, the corresponding contacts of all of the banks of all of the selecting switches SS are multiply connected together. In this manner, the dictating machine DM1 is marked busy to all other selecting switches.

Referring now to Fig. 3, the relay 36, upon energizing, attracts its armatures, thereby at its upper armature opening the circuit of the idle lamp L3, which when lighted indicates the idle condition of the machine DM1 and which is also located in the supervisor's panel, by removing negative battery from the conductor 59 to extinguish the lamp L3 to indicate to the supervisor along with the lighted lamp L4 that the dictating machine DM1 is now being used; at its inner upper armature, preparing a locking circuit for the reproduce relay 40; at its lowermost armature completing the circuit for the Ediphone motor M; at its middle lower armature completing the filament circuit of the amplifier; and at its innermost lower armature completing the obvious circuit for tone relay 37.

Relay 37 energizes and at its armature and make contact completes a circuit for its upper winding in series with its lower winding, which upper winding, since it is in opposition to the lower winding, causes the relay 37 to retract its armature and open the circuit of its upper winding. Relay 37 again energizes and attracts its armature to again complete the circuit for its upper winding. This alternate energization and deenergization of the relay 37 produces a tone which is transmitted to the dictator A by way of the condenser 78, armature 47 and resting contact of relay 38, armature 54 and resting contacts of reproduce relay 40, line conductor 28, and thence over the line circuit through the receiver R of the telephone instrument, back over the line conductor 27, thence by way of resting contacts and armatures 53 and 46. This tone notifies the dictator A that his telephone instrument is now connected to a dictating machine and that he may proceed with the dictation of his letters.

Dictator A now presses the dictating key K and commences to talk into the transmitter T. Operation of the dictating key K, which is so depressed while the dictator is talking into the transmitter T, connects positive battery from the common conductor 4 to control conductor 1 to complete the circuit of control relay 29, Fig. 3, as follows: positive battery on conductor 4, closed contacts of key K, conductor 1, armature 9 and make contact of switching relay 8, wiper 17 of selecting switch SS, first contact in the banks of wiper 17, conductor 23, and winding of relay 29, Fig. 3, to negative battery.

It will be noted that the control relays 29, 30 and 31 have their contacts and armatures arranged in pyramidal formation so that operation of these relays in combinations can be used to control a plurality of circuits in the well-known manner.

Completion of the circuit of control relay 29 causes that relay to energize and attract its single armature into engagement with its make contact to complete a circuit from positive battery on that armature and make contact, inner upper armature and resting contact of control relay 30, armature 34 and resting contact of control relay 31, and winding of the trip relay 38 to negative battery. Relay 38 thereupon energizes and attracts its armatures, thereby at its armature 43 opening the circuit of record relay 39 to prevent any possible operation of that relay at this time, at its armature 44 opening the circuit of the relay 49 to also prevent any operation of this relay at this time, at its armatures 46 and 47 disconnecting the tone generated by the relay 37 from the line conductors 27 and 28, and at its armature 45 connecting positive battery to the conductor 67 to complete the circuit of the clutch magnet 76 of the dictating machine DM1 to operate the clutch to connect the mandrel of the dictating machine to the motor in a well-known manner.

Voice currents now in the talking circuit including the line conductors 27 and 28, which conductors are connected to the input circuit of the amplifier by way of armatures 56 and 57 and the resting contacts of the relay 41, will be amplified by the amplifier and transmitted to the voice-current impression maker of the dictating machine over the output circuit of the amplifier which includes the resting contacts and armatures 55 and 58 of relay 41 and the conductors 69 and 70. Recording will take place therefore as long as the dictating key K remains depressed since relays 29 and 38 and clutch magnet 76 will remain operated as long as the dictating key is depressed. Release of the dictating key K opens the circuit of the relay 29 which thereupon deenergizes and opens the circuit of the trip relay 38 which in turn deenergizes and at its armature 45 and resting contacts completes the circuit over conductor 68 for the "clutch-out" magnet 77 which operates and disconnects the mandrel from the motor M. At armatures 46 and 47 of relay 38 the tone is reconnected to the line conductors.

Whenever the dictating key K is depressed or released, the operations just described will take place and it might be mentioned that these operations will take place frequently because it is customary for a dictator when pausing for any length of time in his dictation to release the key K.

After completely dictating one letter and before commencing the dictation of a second letter the dictator will momentarily depress the length key K5 to indicate on a record card at the dictating machine, the length of the letter which has just been dictated in order to assist the transcriber. It is immaterial whether or not the dictating key K has been released when the key K5 is depressed, but it is a good habit to release the key K whenever one of the keys K1 to K6 is depressed, because in the case of certain of the keys it is necessary that the key K be released in order to obtain the correct function, as will be evident as the description progresses.

The momentary operation of the key K5 momentarily connects positive battery on the conductor 4 to the control conductors 1, 2, and 3 simultaneously, to complete circuits by way of armatures 9, 10, and 11 of relay 8, and wipers 17, 18, and 19 of selecting switch SS, conductors 23, 24, and 25, to the recontrol relays 29, 30, and 31. These three relays energize and simultaneously attract their armatures, when their circuits are so completed, to complete one circuit and at the same time open the circuit of the relay 38 which would have been closed by the operation of the relay 29 as previously described. The circuit completed by the three relays is traceable from positive battery, armature and make contact of relay 29, lower armature and make contact of relay 30, armature 35 and make contact of relay 31, conductor 65, and winding of length magnet 74 to negative battery. This length magnet 74 is similar to the solenoid 8 in the United States patent of E. B. Basch, No. 1,278,565, and operates in the manner described in that patent to make a pencil mark on the record card to indicate the length of the letter.

If it has happened that the dictator has made an error while he is dictating, he will immediately release the dictating key K and momentarily depress the correction key K1 to indicate on the record card at the dictating machine the occurrence of such error to aid the transcriber. In order to obtain a correct result from the operation of the correction key K1, the dictating key K must be released.

The momentary operation of correction key K1 momentarily connects positive battery from conductor 4 to control conductor 2 to complete the previously-described circuit of control relay 30. Relay 30 energizes when its circuit is so completed and attracts its armature to complete the circuit from positive battery on armature of relay 29 and its resting contact, upper armature and make contact of relay 30, armature 33 and resting contact of relay 31, conductor 62, and winding of correction magnet 72 to negative battery. Correction magnet 72 thereupon operates in a manner similar to the length magnet 74 to indicate on the record card the occurrence of an error. The dictator now operates the dictating key K and states into the transmitter the correction to be made in the dictation recorded. The transcriber by reference to the record card can tell where in the portion of dictation an error has occurred and can therefore be on the lookout for such error when transcribing in order that the correct transcription may be obtained.

If the letter which has just been dictated is one which is wanted in a hurry, the dictator may mark the record card "rush" at this stage or, if he so desires, can mark the record card "rush" before commencing the dictation of the letter, or at any time during the course of dictation. This "rush" marking is obtained by first releasing the dictating key K and then momentarily depressing the "rush" key K6 to momentarily connect positive battery on conductor 4 to conductors 2 and 3 to simultaneously complete the previously-traced circuits for the control relays 30 and 31.

The control relays 30 and 31 thereupon operate and complete the following circuit for the rush magnet 73: from positive battery by way of armature and resting contact of relay 29, upper armature and make contact of relay 30, armature 33 and make contact of relay 31, conductor 63, and winding of rush magnet 73 to negative battery. The rush magnet 73 is similar to the length magnet 74 and when its circuit is completed it operates similarly to length magnet 74 to indicate in the proper place on the record card that the letter is rush.

If the dictator at any stage of the dictation should desire to listen to what has been recorded by the dictating machine DM1 he may do so by first releasing the dictating key K to stop the mandrel of the dictating machine and then momentarily depressing the reproduce key K2 to momentarily connect positive battery on conductor 4 to control conductor 3 to thereby cause a momentary operation of the control relay 31, and to momentarily connect positive battery to the winding of the relay 5 to cause the operation of that relay. Relay 5 upon operating, at its lower armature locks itself to positive battery on conductor 4 by way of normally-engaged contacts of the record key K4, and at its upper armature lights the lamp L to indicate to the dictator that the dictating machine is set in reproducing position and that he should not attempt to talk into the transmitter at this time.

The operation of the control relay 31 completes a circuit from positive battery by way of armature and resting contact of relay 29, upper armature and resting contact of relay 30, armature 32 and resting contact of relay 31, conductor 61, winding of reproduce relay 40, to negative battery by way of armature 44 and resting contact of trip relay 38, relay 38 at this time being deenergized because of the deenergized condition of control relay 29.

Relay 40 thereupon operates and at its armature 49 completes the locking circuit for itself which was prepared by the operation of the line relay 36 as previously described. At armature 50, relay 40 completes the circuit for the amplifier reversal relay 41, which relay by the attraction of its armatures 55 to 58, inclusive, into engagement with their make contacts reverses the connection of the amplifier to the line conductors 27 and 28 and to the conductors 69 and 70 so that the reproduction from the record of the dictating machine will be amplified and transmitted to the receiver R of the telephone instrument of dictator A when the reproduction takes place.

At its armature 51, relay 40 connects itself to negative battery through the resistor 12, in multiple with that by way of armature 44 and resting contact of relay 38, while at its armature 52 and its make contact it connects the negative battery through the resistor 12 to one terminal of the winding of the back-space relay 42 to prepare that relay for possible operation. At armatures 53 and 54, reproduce relay 40 disconnects the tone generated by the relay 37 from the conductors 27 and 28 and at its armature 48 completes the obvious circuit by way of conductor 60 for the reproduce magnet 71.

Referring now to Fig. 5, it will be seen that the carriage for the voice-current impression maker 84, which consists of the well-known impression-making and reproducing apparatus, is slidably mounted on the shaft 83 of the dictating machine, on which shaft it is moved in the well-known manner by a drive screw when the mandrel of the dictating machine is connected to the motor in the well-known manner. The stylus controlling lever 81 is normally biased by means of the tension spring 82, conveniently secured at one end to lever 81 and at the other end to the carriage, to hold the impression-making stylus in operating position and to hold the reproducing stylus out of operating position. This lever 81 is connected to the plunger 79 of the reproduce solenoid-magnet 71 by means of the connecting rod 80, the solenoid magnet 71 being secured to the slidable carriage carrying the impression-making and reproducing device 84 by a suitable bracket or any other convenient mounting arrangement. From this arrangement it can be seen that the completion of the circuit of the reproduce magnet 71 by the reproduce relay 40, as has been described, will cause that magnet to energize and draw in its plunger 79 and thereby move the lever 81 from its normally-biased position to the right to withdraw the impression-making stylus from the operating position and place the reproducing stylus in the operating position in the manner which is well known by those acquainted with manually-operated dictating machines. Since the reproduce relay 40 has locked itself energized, the circuit of the reproduce magnet 71 will be maintained and the stylus control lever 81 will be maintained in the reproduced position.

Operation of the dictating key K at this time will cause the operation of the clutch magnet 76 as has been described to start the mandrel rotating, and the dictator in his receiver will hear the last few words recorded on the record of the dictating machine since in the construction of the dictating machine the reproducing stylus is slightly offset from the recording stylus, being arranged to ride over the last few impressions made by the recording stylus when the just-described operations take place.

Should the dictator desire to have more than just the last few words of the matter recorded on the record of the dictating machine reproduced, he may back-space the carriage carrying the reproducing stylus as far back as desired by the operation of the back-space key K3. When operating the back-space key K3, it is not necessary for the proper functioning of the equipment to release the dictating key K. A momentary operation of the back-space key K3 connects positive battery on the conductor 4 momentarily to the control conductors 1 and 3 to momentarily complete the circuits previously traced for the control relays 29 and 31. Control relays 29 and 31 operate momentarily and simultaneously to momentarily complete the following circuit: positive battery or armature and make contact of relay 29, lower armature and resting contact of relay 30, armature 34 and make contact of relay 31, conductor 64, winding of back-space relay 42, make contact and armature 52 of reproduce relay 40, to negative battery through the resistor 12. Relay 42 operates in this circuit and completes the obvious circuit by way of conductor 66 for the back-space magnet 75.

The manner in which the back-space magnet 75 functions to back space the carriage and the mechanical details in connection with such function may be the same as the arrangement disclosed in Patent No. 1,178,014, issued on April 4, 1916 to M. H. Holland. If one operation of the back-space magnet 76 has not back-spaced the carriage far enough to cause the reproduction of enough of the recorded matter, the back-space key K3 may be operated as many times as desired until the reproducing stylus has been back-spaced the required distance.

When the reproducing has been finished and it is the desire of the dictator to continue the dictation, the record key K4 must be momentarily operated. The momentary operation of the record key K4 causes the momentary engagement of its normally-opened contacts and the momentary opening of its normally-engaged contacts. The opening of the normally-engaged contacts opens the locking circuit of relay 5, which relay thereupon deenergizes and extinguishes the reproduce signal lamp L. The engagement of the normally-opened contacts connects positive battery from the conductor 4 to control conductors 1 and 2 to thereby cause the momentary and simultaneous operation of the control relays 29 and 30 over the circuits previously described. The momentary operation of relays 29 and 30 momentarily completes the following circuit: positive battery on armature and make contact of relay 29, lower armature and make contact of relay 30, armature 35 and resting contact of relay 31, resting contact and armature 43 of relay 38, winding of record relay 39 to negative battery. The recording relay 39 operates in this circuit and attracts its armature to open the locking circuit of the reproduce relay 40.

Reproducing relay 40 thereupon deenergizes and retracts all of its armatures to open the circuit of the reproducing magnet 71, to open its own locking circuit, to open the circuits of the amplifier reversal relay and the back-space relay, and to reconnect the tone generated by the tone relay 37 to the line conductors 27 and 28.

When the circuit of the reproducing magnet 71 is opened, the magnet deenergizes and the stylus control lever 81 is then moved into the position in which it is shown in the drawings by the coil spring 82. The opening of the circuit of the amplifier reversing relay 41 allows that relay to deenergize and retract its armatures 55 to 58, inclusive, thereby reconnecting the amplifier to the dictating machine as it is connected in the drawings.

The dictator may now proceed with further dictation after depressing the dictating key K.

When there is more dictation than can be recorded upon one record, the dictator is furnished a signal to indicate when the record is practically full so that he can stop his dictation before the recording stylus runs off of the end of the record. The dictating machine is supplied with normally open contacts FC, which, when the carriage bearing the recording stylus has moved a predetermined distance, are moved into engagement with each other to connect direct positive battery to the test conductor 26.

The connection of positive battery to conductor 26 short circuits relay 6, Fig. 1, which relay thereupon deenergizes and completes the circuit for the signal lamp L1 by way of armature 12 and make contact of relay 8. This lights the signal lamp L1 to indicate to the dictator that the cylinder is practically full. The connection of the direct positive battery to the conductor 26 maintains the signal lamp L4 lighted in the supervisor's panel.

In order that the dictator may continue with his dictation upon another record, after releasing the dictating key K he will momentarily open the contacts C in the telephone stand. This momentary opening of the contacts C opens the circuit of the relay 7, Fig. 1, and the line relay 36, Fig. 3, which relays thereupon deenergize. Relay 7, upon deenergizing, opens the circuit of relay 8 which relay deenergizes in turn. Relay 8, upon deenergizing retracts all of its armatures 9 to 15, inclusive, to restore the equipment to the position in which it is shown in the drawings. When the line relay 36 deenergizes, at its lowermost armature, it opens the circuit of the motor M of the dictating machine, at its middle lower armature, it opens the filament circuit of the amplifier, at its innermost lower armature, it opens the circuit of the tone relay 37, and at its uppermost armature, it reconnects negative battery to conductor 59 to light the lamp L3 in the supervisor's panel. The contacts FC in the dictating machine remain closed until the operator removes the full record and restores the recording stylus to its starting position. The supervisor will be informed of a dictating machine having a full cylinder by the simultaneous burning of the lamps L3 and L4.

Since direct positive battery remains connected to the conductor 26 through the spring contacts FC, the dictating machine DM1 remains busy to all of the selecting switches SS until the full record of the machine has been removed. Therefore, when the springs C have closed again after their momentary opening, the switch SS will find the dictating machine DM1 busy and it will operate as previously described to select an idle machine.

When a dictating machine is found, the switching relay 8 will function to connect the telephone instrument of dictator A to the idle dictating machine. Upon receipt of the tone, the dictator may proceed with his dictation.

When the dictator has finished his dictation he will replace the telephone instrument in the cradle, or place the receiver upon the receiver hook depending upon the type of telephone instrument used, which placement will cause the contact springs C to be opened and held opened until the telephone instrument is again removed. If the dictation on the first machine was not sufficient to fill the record, the machine when released will be available to another dictator since the springs FC were not moved into engagement with each other. In this case, the restoration of the relay 8 following the restoration of relay 7, disconnects the relay 6 from the wiper 20 and consequently from the conductor 26 to extinguish the busy lamp L4 in the supervisor's panel. The restoration of the line relay 36 of the second dictating machine will relight the lamp L3 to indicate to the supervisor that this machine has been vacated. Since, however, the lamp L4 has been extinguished, the supervisor will not at this time change the record.

When dictator B desires to dictate, he will control his equipment in the same manner as just explained for dictator A. The description of the functioning of the equipment under control of dicator A will suffice for the description of the functioning of the equipment under control of dictator B merely by substituting the primed reference numerals and characters for the unprimed numerals and characters.

The capacity of the selecting switches SS and consequently the size of the group of dictating machines will be determined by the requirements of the system.

From the foregoing, it can be appreciated that by the system of this invention dictating machines can be readily controlled from a distance to perform the same functions which they would were the machines close at hand, and just as efficiently.

The invention having been thus described, what is considered new and what is desired to have protected by Letters Patent is pointed out in the appended claims.

What is claimed is:

1. In a recording system, the combination of a dictating machine having combined recording and reproducing apparatus normally conditioned for recording and having electromagnetic means for conditioning said apparatus for reproducing, a remote dictating station, means at said station for controlling said machine to record dictation, means at said station for operating said electromagnetic means to condition said machine for reproducing the recorded dictation, and means at said station for indicating when said electromagnetic means is in operated condition.

2. In a recording system, a plurality of dictating machines, a remote dictating station, means for automatically selecting one of said dictating machines and associating it with said station, and means at said remote dictating station for electrically controlling the selected machine to record or reproduce at will.

3. In a recording system, a plurality of dictating machines, a remote dictating station having a telephone, means responsive to the removal of the receiver of said telephone from the hook for selecting one of said machines, and means at said station for thereafter electrically controlling the selected machine to record or to reproduce at will.

4. In a recording system, a phonographic recorder having a recording stylus normally in operative relation with the record and a reproducing stylus in inoperative relation with the record, a dictator's telephone instrument, means responsive to the removal of the receiver from the switchhook for telephonically connecting said instrument to said recorder, dictator controlled means for controlling the recorder to record matter spoken into said instrument, dictator controlled means for conditioning said recorder for reproduction by placing said reproducing stylus in operative relation with the record and removing said recording stylus therefrom, and dictator controlled means for back-spacing said reproducing stylus to reproduce as much of the recorded matter as desired.

5. In a recording system, a phonographic recorder having a recording position and a reproducing position, said recorder normally biased to the recording position, a remotely located dictator's position having a telephone instrument, means for telephonically connecting said instrument with said recorder, electromagnetic means associated with said recorder and controlled from the remote position for controlling said recorder to record matter dictated into said instrument, electromagnetic means controlled from the remote position for moving said recorder to the reproducing position, and means for indicating to the dictator that said recorder is in the reproducing position.

6. In a recording system, a phonographic recorder having a recording position and a reproducing position, said recorder biased to the recording position, a dictator's telephone instrument, means for telephonically connecting said instrument to said recorder, dictator controlled means for controlling said recorder to record matter dictated into said instrument, an amplifier in said telephonic connection and normally connected to amplify the dictated matter, and dictator controlled means for moving said recorder to the reproducing position and for reversing the connection of said amplifier to amplify the reproduced matter.

7. In a recording system, a plurality of phonographic recorders, a dictator's telephone instrument having a switch associated therewith, means responsive to the closure of said switch for automatically selecting one of said recorders and telephonically connecting the telephone instrument with the selected recorder, means responsive to said connection for notifying the dictator of such connection, and dictator controlled means for controlling the selected recorder to record matter dictated into said instrument.

8. In a recording system, a plurality of phonographic recorders, a plurality of dictators' telephone instruments, each of which has a switch associated therewith, telephone instruments, means associated with each telephone instrument and responsive to the closure of the switch of the associated telephone instrument for automatically selecting an idle one of said recorders, means responsive to such selection for marking the selected recorder busy to the selecting means of the other instruments and for telephonically connecting the associated instrument to the selected recorder, and dictator controlled means for controlling the selected recorder to record matter dictated into said telephone instrument.

9. In a recording system, a plurality of phonographic recorders, each capable of performing a plurality of functions, a dictator's telephone instrument, a dictator's key set, there being a key in the set for each function of the recorder, a control relay group associated with each recorder, means associated with said instrument for selecting a dictating machine, and means responsive to that selection for telephonically connecting said instrument to the selected recorder and connecting said key set to the associated relay group, said relay group thereafter responsive to the operation of one of said keys for controlling said recorder to perform the function corresponding to the key operated.

10. In a recording system, a plurality of phonographic recorders, each recorder normally in a recording position and capable of being moved to reproducing position, a dictator's telephone instrument, a dictating key, a reproduce key, and a record key associated with said instrument, means associated with said instrument for selecting one of said recorders and connecting said instrument and keys to the selected recorder, means associated with the selected recorder and responsive to the operation of said dictating key for operating the recorder to record matter dictated into said instrument, means responsive to the operation of said reproduce key for moving said recorder from the recording position to the reproducing position to reproduce the matter previously recorded, and means responsive to the operation of said record key for restoring said recorder to the recording position.

11. In a recording system, a plurality of dictators' positions, a telephone instrument at each position, a plurality of phonographic recorders common to all of said positions, means associated with each telephone instrument for selecting an idle one of said recorders, means responsive to such selection for connecting the selected recorder to the associated telephone instrument and for marking said recorder busy to the other positions, dictator controlled means for thereafter controlling the selected recorder to record matter dictated into the telephone instrument to which it is connected, a supervisor's position, and signalling means for notifying the supervisor and the dictator that the selected recorder has recorded all of the matter it is capable of recording.

12. In a recording system, a plurality of phonographic recorders, a plurality of dictators' telephone instruments, a step-by-step selecting switch associated with each dictator's telephone instrument for selecting an idle one of said recorders, means responsive to such selection for marking the selected recorder busy to the other switches and for telephonically connecting the selected recorder to the associated telephone instrument, dictator controlled means for operating said recorder to record matter dictated into the telephone instrument connected thereto until the record of said recorder is full, and means in the recorder and operated upon the record becoming full for maintaining said busy marking until the full record has been removed.

13. In a recording system, a plurality of recording devices, each having record means of a limited capacity for recorded matter, a plurality of transmitting stations, means associated with each station for automatically selecting an idle one of said recorders and connecting it to the associated transmitting station, means responsive to such selection for marking the selected recorder busy to the other selecting means, means associated with the selected recorder and operable from a connected transmitting station after such selection to cause the recorder to record matter transmitted thereto from the connected transmitting station, and means in the recorder operated when said capacity is reached for signalling the connected transmitting station to that effect and for maintaining the recorder busy to all said selecting means until the record means has been removed.

14. In a recording system, a plurality of dictating machines, a remote dictating station, a rotary switch controlled from said station for automatically selecting one of said machines and electrically connecting it with said station, and electromagnetic means associated with the selected machine and controlled from said station over said connection for causing the selected machine to record matter dictated at said station and electrically transmitted thereto over said connection or to electrically reproduce recorded matter over said connection to said station at will.

15. In a recording system, a plurality of dictating machines, a remote dictating station, a selecting switch associated with said machines, circuit controlling means at said station for controlling said switch to automatically select one of said machines and connect it to said station, circuit controlling means at said station for thereafter controlling the selected machine to cause it to record matter dictated at the station, and other circuit controlling means at the dictating station for controlling said machine to cause it to reproduce at will as much of the recorded matter as desired.

16. In a recording system, a dictating machine, a remotely located telephone instrument, means for telephonically connecting said instrument to said machine, means associated with said instrument for electrically controlling said machine to record matter dictated in said instrument, means operating automatically responsive to said connection for generating a tone audible in said instrument to indicate such connection, and means for rendering said tone generating means ineffective while said machine is being controlled to record dictation.

17. In a recording system, a recording station, a plurality of phonographic recorders thereat, each recorder having a limited capacity for recording matter, a selecting switch associated with said recorders, a supervisor's position at the recording station and having signalling apparatus individual to each recorder, a remote dictating station having a telephone instrument, means at said dictating station for controlling said selecting switch to select an idle one of said recorders and to connect said instrument thereto, means effective upon the selection of an idle recorder for marking the selected recorder busy and operating the signalling apparatus individual thereto to indicate at said position the busy condition of that recorder, and means associated with each recorder for operating the signalling apparatus individual thereto to indicate at said position that the limit of its capacity for recording matter has been reached.

18. In a dictating machine, in combination, sound recording and reproducing apparatus selectively shiftable into recording and reproducing engagement with a record, electrically operable means for shifting said apparatus from either position to the other, electrically operable means for back-spacing said apparatus with respect to the record to repeat a portion thereof, and electrical means for rendering said back-spacing means inoperative whenever said apparatus is in recording position.

19. In a dictating machine, in combination, sound recording and reproducing apparatus selectively shiftable into recording and reproducing engagement with a record, electrical means for shifting said apparatus from either position to the other, said means comprising an electromagnet, an armature attracted by said magnet, and means for transmitting the motion of said armature to said apparatus, electrically operable means for back-spacing said apparatus with respect to the record to repeat a portion thereof, and means associated with shifting means for rendering said back-spacing means ineffective when said apparatus is in recording position.

20. In a dictating machine, in combination, sound recording and reproducing apparatus selectively shiftable into recording and reproducing engagement with a record, electrical means for shifting said apparatus from either position to the other, means for back-spacing said apparatus with respect to the record to repeat a portion thereof, an electric control circuit for causing operation of said back-spacing means, and means associated with said shifting means for preventing closure of said control circuit whenever said apparatus is in recording position.

21. In a phonograph system, in combination, a phonograph, a driving motor, a dictator's station comprising a telephone transmitter and receiver, an electrical recorder and reproducer, an amplifier for amplifying speech currents, and means at said dictator's station for preparing the system for operation, said means initiating operation of said motor and supplying operating potentials to said amplifier.

22. In a phonograph system, in combination, a phonograph, an amplifier, electrical means associated with said phonograph for recording and reproducing, a telephone, including transmitter and receiver, said amplifier having input and output circuits, one of said circuits being associated with said telephone and the other with said electrical means, and means for interchanging said amplifier circuits.

23. In a phonograph system, in combination, a phonograph arranged to record and reproduce selectively, a dictator's station, comprising means for causing operation of said phonograph and for terminating operation thereof, means for shifting said phonograph from recording to reproducing position, means for indicating which position said phonograph is in, and means for indicating when said phonograph is in readiness to record dictation.

LOUIS A. DE BERARD.
GEORGE T. MARTIN.